United States Patent [19]

Farrell

[11] 4,056,590

[45] Nov. 1, 1977

[54] BLOW MOLDING METHOD WITH DOUBLE CYCLE FOR CORE RODS

[75] Inventor: John J. Farrell, Green Brook, N.J.

[73] Assignee: Farrell Patent Company, Greenbrook, N.J.

[21] Appl. No.: 628,881

[22] Filed: Nov. 5, 1975

Related U.S. Application Data

[62] Division of Ser. No. 476,092, June 3, 1974, Pat. No. 3,923,441.

[51] Int. Cl.$^2$ ............................................. B29C 17/07
[52] U.S. Cl. ........................................ 264/89; 264/97
[58] Field of Search ........................... 264/89, 94, 97; 425/242 B, 324 B, 387 B, DIG. 208, DIG. 209, DIG. 211, DIG. 213, DIG. 203

[56] References Cited

U.S. PATENT DOCUMENTS 3,797,983  3/1974  Merz .................................. 264/97 X Primary Examiner—Jan H. Silbaugh
Attorney, Agent, or Firm—Marvin Feldman; Stephen E. Feldman

[57] ABSTRACT

This blow molding method applies a coating to a core rod and then moves the core rod into an inactive position in which it travels through one cycle of the apparatus before being brought into interaction with a blowing and stripping station during a second cycle. This travel of the parison with the core rod in an inactive position allows time for the parison to be brought to a temperature for biaxial orientation before blowing the parison. The cooling can also be used to bring the parison to a condition at which a second coating can be applied over the parison to make a laminated container or other article. The preferred construction has the core rods hinged to an indexing table for movement between active and inactive positions.

13 Claims, 7 Drawing Figures

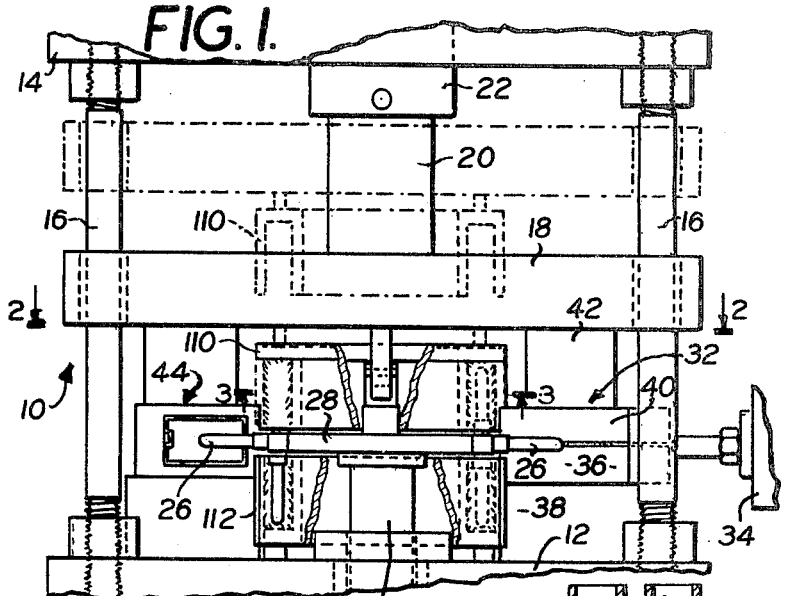
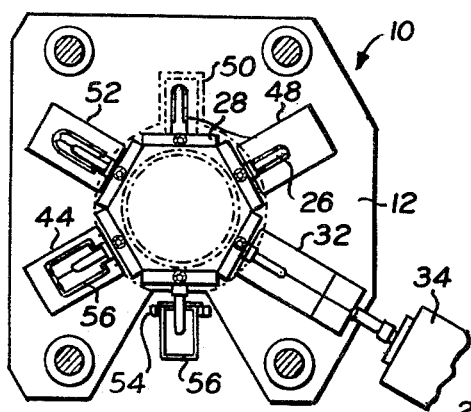
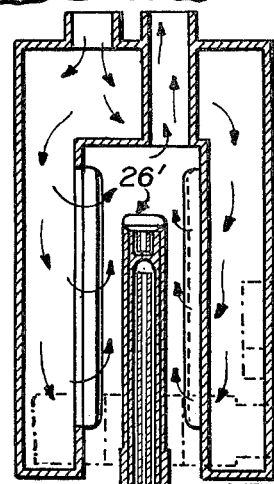
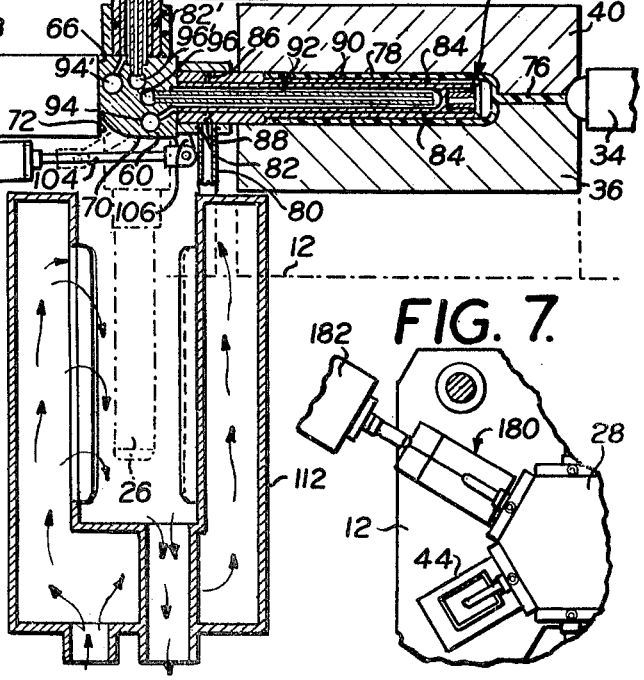

BLOW MOLDING METHOD WITH DOUBLE CYCLE FOR CORE RODS

This is a division of application Ser. No. 476,092, filed June 3, 1974, now U.S. Pat. No. 3,923,441.

BACKGROUND AND SUMMARY OF THE INVENTION

In blow molding apparatus,, the coating applied to the core rods is generally applied by injection molding and the material is at very high temperature as it comes from the injection mold. In order to obtain biaxial orientation of the plastic during the blowing operation, the plastic must be cooled to a temperature approaching its hardening or crystallizing temperature. If the apparatus is operated slowly enough to permit the parison to cool to orientation temperature while travelling from an injection mold to a blowing mold, the production rate of the apparatus is greatly impaired.

This invention obtains the necessary time for controlling the temperature of the parison without reducing the speed of the machine cycle. This result is accomplished by having each core rod, after being coated with a parison, move into an inactive position before reaching the blowing station. The core rod remains in this inactive position, where it does not interact with any stations of the machine, and passes through a full cycle of travel and back past the station at which it was coated and to the location at which it moved into inactive position.

Each successive core rod is then returned to its active position and passes on to the blowing station and stripper station in accordance with conventional operation.

During this extra cycle of movement of each core rod, its temperature can be controlled so that the parison will be at orientation temperature when it reaches a blowing station. The time can also be used to reduce the temperature of the parison to a low enough temperature so that another coating of plastic can be applied over the cooled parison without impairing the cooled parison, if it is desired to make a molded article of laminated construction.

Where the apparatus is constructed for biaxial orientation of the blown article, the blowing is preferably carried out in two stages. The parison is first introduced into a blowing mold which is shaped so that the blowing in this first blowing mold expands the parison to a much greater degree in a direction lengthwise of the core rod for orientation in that direction. The partially blown article is then carried to a second blowing mold where the cavity is of larger diameter so that the blowing operation in the second blowing mold increases the diameter of the blown article and thus provides orientation in a circumferential direction.

Where a laminated product is to be blown, a second injection mold is substituted for the first blowing mold and the core rod with two layers of plastic on it is then moved to a blowing station where both layers are blown simultaneously to produce a laminated container or other article.

In order to obtain more control of the change in temperature of the parison while moving through the cycle for temperature control, a chamber is provided with an open side into which the core rods that are in inactive position can travel while subject to contact with fluid used to control the temperature of the parison. Usually this fluid will be at a substantially lower temperature than the plastic of the parison since the temperature control required for orientation or for the extrusion of a subsequent layer of plastic, is a reduction in temperature. The temperature control fluid, usually air, is circulated by control means that are adjustable to regulate the temperature of the temperature control fluid.

In the preferred embodiment of the invention, the core rods extend outwardly from an indexing table when in active position for cooperation with the coating station, blowing station and stripper station. The core rods are moved into inactive positions by swinging them upwardly or downeardly into positions where they extend in directions having substantial components that are parallel to the axis of rotation of the indexing table. Temperature controlling chambers are provided both above and below the indexing table so as to receive the core rods that extend downwardly as well as those which extend upwardly. The chamber has a wider portion at a location between the coating station and the first blowing station so that there is space for core rods to swing between active and inactive positions at this wider space between the coating and blowing stations.

Other objects, features and advantages of the invention will appear or be pointed out as the description proceeds.

BRIEF DESCRIPTION OF DRAWING

In the drawing, forming a part hereof, in which like reference characters indicate corresponding parts in all the views:

FIG. 1 is a diagrammatic, fragmentary side elevation of a blow molding apparatus made in accordance with this invention;

FIG. 2 is a sectional view taken on the line 2—2 of FIG. 1;

FIG. 3 is a fragmentary view, partly in section, and partly broken away, on an enlarged scale showing details of the apparatus shown in FIGS. 1 and 2, the sections through the temperature control chambers being taken on the line 3—3 of the reduced scale drawing of FIG. 5;

FIG. 7 is a fragmentary view showing a modification of the structure shown in FIG. 2.

DESCRIPTION OF PREFERRED EMBODIMENT

Figure 4:
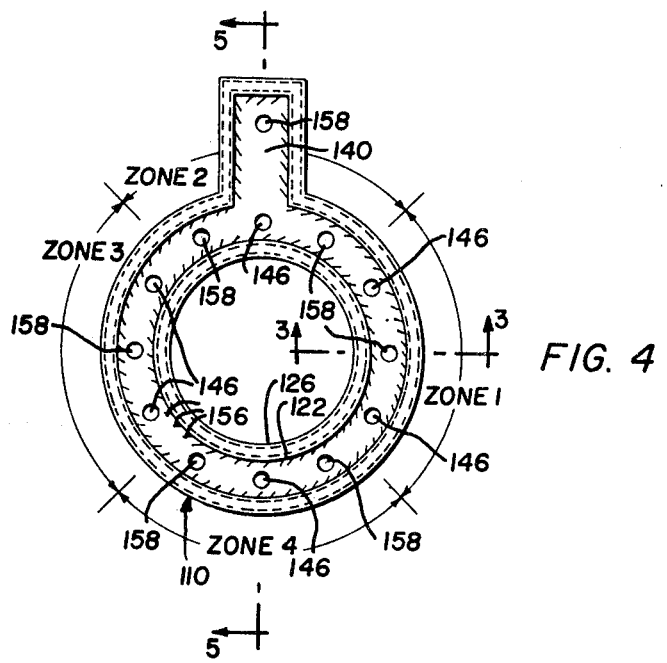
FIG. 4 is a diagrammatic top plan view of the temperature control chamber for the core rods which extend upwardly.

FIG. 1 shows a blow molding machine 10 having a frame which includes a base plate 12, and an upper frame section 14 connected to the base 12 by columns 16. A movable platen 18 is moved up and down along the columns 16 by a platen ram 20 having a hydraulic motor 22 connected to the upper frame 14.

Core rods 26 are carried by an indexing table 28 supported by a piston rod 30 which extends upward from a hydraulic motor.

The blow molding machine has a coating station comprising an injection mold 32 into which core rods 26 extend to receive a parison which is injected into the mold 32 from a plasticizer 34. The mold 32 has a fixed lower section 36 secured to a fixed platen 38 attached to the base 12. The mold 32 also has an upper movable section 40 which is raised and lowered with respect to the fixed section 36 to open and close the mold 32. The upper section 40 is attached to the movable platen by a connection structure 42 so that the section 40 of the mold moves as a unit with the movable platen 18.

The molding machine can also include a blowing station comprising a blow mold 44 which is made in two sections like the injection mold 32 attached to the base 12 and movable platen 18 in the same way as the injection mold.

FIG. 2 shows the molding machine 10 to be a six-position machine. The indexing head 28 is hexagonal and there are core rods 26 extending from each of the faces of the table 28.

There are six operational stations around the table 28, spaced angularly from one another by angles of 60° C corresponding to the angular relation of the side faces of the table 28. The first station is the coating station with the injection mold 32. This injection mold can be replaced with other means for coating the core rods but an injection mold is used in the preferred embodiment of the invention. The second operational station, indicated by the reference character 48, is a conditioning station in which the parison on the core rod may be initially cooled, and in which the parison is blown to a small extent to make it enough longer than the core rod to prevent shrinkage of the parison from pulling the neck end of the parison away from the conventional flange at the neck end of the core rod.

The third station is a transition station 50 at which core rods are moved between active and inactive positions as will be more fully explained in connection with other figures.

The fourth station is a first blowing station comprising a blow mold 52 in which the mold cavity is shaped so that the parison blown in this mold 52 is stretched principally in a direction lengthwise of the core rod to obtain orientation of the plastic in that direction.

The next operational station is a second blowing station comprising the blow mold 44; and the last station is a stripper station 54 at which an article 56 blown in the blow mold 44, is ejected from the core rod so that the core rod is ready for another parison when it reaches the injection mold 32.

Figure 6:
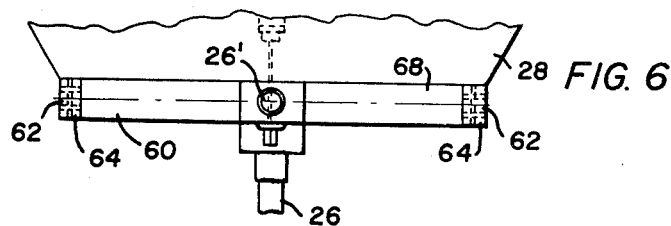
FIG. 6 is a fragmentary top plan view showing the connection of a group of core rods to one face of the indexing table; and also showing the power mechanism for moving the core rods between active and inactive position.

FIG. 3 shows the way in which the core rods 26 are supported from the table 28. Each core rod 26 is connected with a fitting 60 which has axles 62 extending from its opposite ends. These axles 62 extend into bearings 64 rigidly connected with a face of the table 28 as shown in FIG. 6. The core rods 26 extend from one side of the fitting 60 and other core rods 26' extend from another face of the fitting 60 and at an angle of substantially 90° to the core rods 26.

In FIG. 3, the core rod 26 is shown in its active position. The core rod 26' is shown in its inactive position. With the parts in the positions shown in full line in FIG. 3, one face of the fitting 60 is in contact with an area of the table 28 which comprises a stop 66 for preventing counterclockwise movement of the fitting 60 any further than the position occupied in FIG. 3.

When the fitting 60 turns in the bearings 64 (FIG. 6) the rotation is about an axis 68. Thus causes a face 70 of the fitting 60 to come in contact with a stop face 72 which constitutes a continuation of the face 66 on the side of the indexing head 28. The core rod 26 is moved into the dotted line position shown in FIG. 3 and the core rod 26' is moved into the full line position of the core rod 26 shown in FIG. 3. Thus the core rod 26 is moved from active to inactive position and the core rod 26' is moved from inactive to active position. This swinging movement of the core rods between active and inactive position does not occur when the core rods are at the mold stations because the lower and upper sections 36 and 40, respectively, of the mold 32 would interfere with the swinging movement of the core rods. The core rods are shifted between active and inactive positions at the transition station which will be explained more fully.

When the plasticizer 34 has injected plastic 76 into the injection mold 32 to form a parison 78 on the core rod 26, the other mold section 40 moves upward and the core rod 26 also moves upward, as shown in broken lines in FIG. 3. The table 28 is then free to turn and carry the core rods 26 and 26' to the next station. As the core rod 26 moves upwardly, it moves away from an air supply pipe 80 which is at a fixed position with respect to the space 12 so that the air supply pipe 80 will move into a sealed inlet orifice 82 in the neck of the core rod 26 or a similar orifice 82' if the core rod 26' is in active position.

There are air passages 84 extending lengthwise through the core rod 26 and communicating with the air supply pipe 80 though an annular changer 86 in the core rod opening into the orifice 82 though a radial passage 88. Air is supplied through the pipe 80 to the air passages 84 only at the time when the parison 78 is to be blown. The core rod 26 has a hollow chamber 90 and a tube 92 extends most of the length of the chamber 90, and this tube 92 is spaced from the sides of the chamber so as to make the chamber 90, outside of the tube 92, of annular cross section. Temperature control fluid passes into this annular chamber 92 from a supply passage 94 in the fixture 70. This temperature controlling fluid travels to the end of the tube 92 and then enters the open end of the tube 92 and flows back to another passage 96 in the fitting 60. Supply and exhaust of fluid to and from the passages 94 and 96 is through hoses (not shown) at the ends of the fitting 60.

The construction of all of the core rods 26 and 26' is similar and provision for supplying blowing air and temperature controlling fluid is the same for all of the core rods; but there are separate passages 94' and 96' for the core rods 26' since the cooling time for these different core rods will not always be the same.

The means for moving the core rods 26 and 26' between their active and inactive positions includes a cylinder-and-piston motor 100 connected with the table 28 by a pivot connection 102. The motor 100 has a piston rod 104 which connects with a crank 106 rigidly attached to the fitting 60. When the piston rod 104 moves to the right in FIG. 3, the core rod 26' is moved into inactive position and the core rod 26 into active position. When the piston rod 104 moves to the left (clockwise) in FIG. 3, the core rod 26' is moved into active position and the core rod 26 into inactive position.

The core rods that are in their inactive positions, can cool as they travel through a cycle in a manner which will be explained. In the preferred construction, however, there is a chamber 110 (FIG. 1) into which the upwardly extending core rods 26' extend as they travel with the table 28 while the table moves intermittently about its axis of rotation. There is another chamber 112 in position to receive the downwardly extending core rods. These chambers 110 and 112 are supported from the movable platen 18 and the base 12, respectively. Thus the upper chamber 110 rises into the dotted line position shown in FIG. 1 when the molds 32 and 44 open and the table 28 rises to lift the core rods clear of the bottom sections of the molds.

Figure 5:
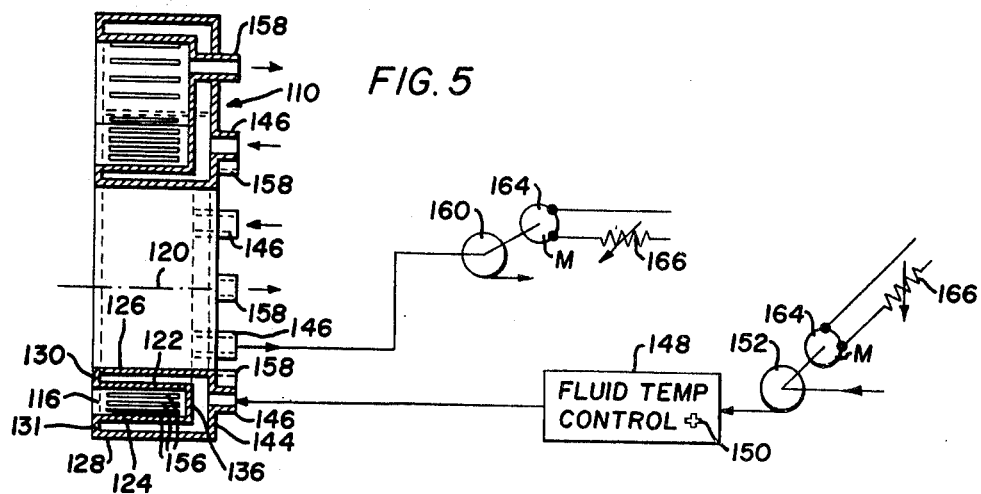
FIG. 5 is a sectional view taken on the line 5—5 of FIG. 4.

The mold 110 is shown on a larger scale in FIG. 4 and in section in FIG. 5. The chamber 112 is of the same construction but is oriented in the opposite direction so as to receive downwardly extending core rods instead of upwardly extending core rods.

FIGS. 4 and 5 show the temperature control chamber 110. The part of the chamber through which the core rods travel as the table rotates is a space 116 which has a center of curvature at the axis of rotation of the table, this axis being designated in FIGS. 4 and 5 by the reference character 120. There are cylindrical walls 122 and 124 defining the inner and outer limits of the space 116; and the space 116 is closed at its upper end by a top wall 126.

There is a jacket formed around the walls 122 and 124 by an inner wall 126 and an outer wall 128 which are evenly spaced from the walls 122 and 124, respectively, around the entire perimeter of the chamber 110. This jacket is closed at its lower end by an annular wall 130 and another wall 136 which is also annular except at a transition station 140 where the space 116 widens out far enough to permit the core rod to swing into and out of the space 116. The jacket is closed at its upper end by a wall 144.

Supply ducts 146 open through the top wall 144. Fluid for temperature control is supplied to the ducts 146 from fluid temperature control means 148 which have a temperature control adjustment 150 and a blower 152 for forcing air through the fluid temperature control means 148 and through the supply ducts 146. The fluid temperature control means 148 is shown connected with only one of the supply ducts 146; but it will be understood that it includes a manifold for supplying temperature control fluid to all of the supply ducts 146 in the preferred construction. Separate fluid temperature means can be provided for each supply duct so that the temperature can be different at different locations around the chamber 110, but for most purposes this is entirely unnecessary.

There are louvers 156 in the walls 122 and 124. The fluid supplied through the ducts 146 into the jacket around the space 116 flows through the louvers 156 and into contact with core rods that are travelling along the annular space 116.

Temperature controlling fluid can exhaust from the chamber 110 through the lower open end of the space 116 through which the core rods extend into the chamber. In the preferred construction, however, the temperature controlling fluid exhausts from the space 116 through exhaust ducts 158 which extend downwardly through the wall 144 and through the wall 126. These exhaust ducts are shown connected with an exhaust blower 160. The exhaust blower 160 is shown connected with only one of the exhaust ducts 158, but as in the case of the temperature control fluid supply, the exhaust ducts 158 are preferably connected with a manifold (not shown) so that the exhaust blower 160 withdraws temperature control fluid from the various exhaust ducts 158 located at angular spacing around the angular extent of the space 116 of the temperature control chamber 110. The direction of flow of the temperature control fluid is indicated by small arrows in FIGS. 4 and 5.

The blowers 152 and 160 are preferably driven by motors 164 having speed controllers 166 for regulating the rate of flow of the temperature control fluid to and from the chamber 110.

Reviewing the operation of the machine, the core rod 26 in FIG. 3 has a parison applied to it in the injection mold 32. After the mold opens and the table lifts the core rod clear of the lower mold section 36, as already described, the table 28 turns to an angle of 60° and carries the core rod 26 to the conditioning station 48. The table 28 lowers to position the core rod 26 at the conditioning station; and on the next 60° movement of the table 28, the core rod 26 is carried to the transition station 50.

At the transition station 50, core rod 26 moves downward into the dotted line position shown in FIG. 3 and this is what is termed herein the "inactive" position. This downward swinging movement is made possible by the extra width of the chamber 110 at the transition station, as illustrated in FIG. 4 of the drawing. With the core rod extending downwardly, substantially parallel to the axis of rotation of the table 28, the core rod 26 is moved with intermittent movements of 60° each, past the first blowing station 52, the second blowing station 60, the stripper station 54, the coating station 32, and the conditioning station 48 back to the transition station 50. The core rod 26 is in its inactive position during all of this movement and is, therefore, within the cylindrical space 116 of the chamber 110 for a full cycle of movement of the table 28.

During this travel of the core rod 26 from the transition station 50 and around the full angular extent of the blow molding machine, the parison on the core rod 26 is subjected to the temperature controlling effect of the fluid supplied to the chamber 110. Ordinarily this treatment will be designed to cool the plastic of the parison to its orientation; that is to the temperature just above the temperature at which the plastic begins to harden. Upon completion of its cycle of travel from the transition station 50 and back to that station, the core rod 26 will be moved back to its active position; the position in which it extends outward from the table 28 so as to have an active correlation with the other stations that surround the table 28.

The next 60° movement of the table 28 carries the core rod 26 to the first blowing station 52 where the parison is partly blown and stretched mostly in a direction parallel to the axis of the core rod, as previously explained.

The next movement of the table 28 carries the partially blown parison on the core rod 26 to the second blowing station 44 where the parison is blown fully to form the article 56 which is produced by the machine shown in the drawing. The next movement of the table carries the core rod 26 to the stripper station 54 where the article 56 is discharged from the core rod 26; and the next intermittent movement carries the core rod 26 back to the injection mold 32 to start another cycle.

If the apparatus shown in FIG. 2 is to be used to make a laminated article, then the first blowing station 52 is replaced by a second coating station comprising an injection mold 180 (FIG. 7) attached to the base 12 by a fixed platen in the same way as the mold 32 already described.

As a result of a full cycle of rotation of the core rod in an inactive position, the parison on the core rod has cooled enough to permit a second parison to be injected over it as an outer layer without impairment of the first parison. The plastics for the outer parison is injected into the mold 180 by a plasticizer 182 which can be of the same construction as the plasticizer 34 previously described.

On the next movement of the table 28, the double layer or laminated parison on the core rod is moved to the blowing station 44 where the two layers of the parison are blown simultaneously to form a laminated, blow molded article. The next movement of the table brings this laminated article to the stripper station where it is pushed off the core rod so that the core rod is ready to return to the first coating station 32 for injection of another parison.

The preferred embodiment of the invention has been illustrated and described, but changes and modifications can be made, and some features can be used in different combinations without departing from the invention as defined in the claims.

What is claimed is:

1. The method of making blow molded articles by injection molding a parison on a core rod, blow molding the parison to form a hollow article, and stripping the article from the core rod comprising, moving successive parison covered cored rods in a temperature conditioning cycle along a course past an injection molding station, a blowing station and a stripping station, said stations being in a common plane and said temperature conditioning cycle being in a plane other than said common plane, each core rod after injection molding being moved along the course past the blowing and stripping stations and past the station at which the parison was injection molded without interaction with any of these stations, and, then with other core rods indexed for operation at said stations, shifting the position of the temperature conditioned parison covered core rod to said common plane and then moving the temperature conditioned parison covered core rod in another cycle into active cooperation with the blowing station to form said article and stripping station to remove said article from the core rod.

2. The method described in claim 1 characterized by cooling the parison during its movement during the first cycle and beyond the station at which the parison was injection molded, then moving each parison covered core rod through its other cycle along said course and into interaction with the blowing station and stripping station.

3. The method described in claim 2 characterized by moving the core rods through their cycles by supporting them from an indexing table that rotates intermittently about an axis, locating the injection station, blowing station and stripping station at angularly related positions around the table, locating each core rod in an outwardly extending position with respect to the injection molding station, moving each core rod into an inactive position extending in a direction having a substantial component parallel to the axis of rotation of the table, rotating the table intermittently through a full revolution with each successive core rod in said inactive position, then returning the core rod to an active position projecting outward at an orientation for interaction with the blowing and stripping stations.

4. The method of claim 2, further comprising injection molding a second parison over the cooled parison.

5. The method of claim 1, further comprising temperature conditioning the parison to its orientation temperature in said cycle before shifting position of the parison covered core rod to the other cycle.

6. The method of claim 5, further comprising preliminary blow molding to axially orient the parison.

7. The method of claim 5, wherein the temperature conditioning comprises passing the parison through a chamber and supplying temperature controlling fluid to the chamber.

8. The method of claim 7, further comprising circulating a temperature control fluid through the core rod in the first cycle to temperature condition the parison.

9. The method of claim 1, wherein the core rod is immediately shifted to the other cycle after completion of the first cycle.

10. The method of claim 1, shifting the core rod back and forth between said positions by rotating the core rod in opposite directions.

11. The method of claim 1, further comprising circulating a temperature control fluid through the core rod in the first cycle to temperature condition the parison.

12. The method of claim 1, further comprising moving the core rods out away from the molds at the molding stations to clear the molds, in the course of travel through said other cycle.

13. The method of claim 1, wherein the shifting of one core rod occurs at the same time as the injection molding, blow molding and stripping operations on other core rods.

* * * * *